United States Patent
Ni et al.

(10) Patent No.: US 9,981,806 B2
(45) Date of Patent: May 29, 2018

(54) CONVEYOR BELT BASED TRANSPORT SYSTEM

(71) Applicants: Zhoumin Ni, New York, NY (US); Guangwei Wang, Fijan (CN)

(72) Inventors: Zhoumin Ni, New York, NY (US); Guangwei Wang, Fijan (CN)

( * ) Notice: Subject to any disclaimer, the term of this patent is extended or adjusted under 35 U.S.C. 154(b) by 0 days. days.

(21) Appl. No.: 15/619,240

(22) Filed: Jun. 9, 2017

(65) Prior Publication Data

US 2018/0002111 A1  Jan. 4, 2018

(30) Foreign Application Priority Data

Jul. 4, 2016 (CN) .......................... 2016 1 0520636
Jul. 4, 2016 (CN) ...................... 2016 2 0696146 U

(51) Int. Cl.
*B65G 23/06* (2006.01)
*B65G 15/64* (2006.01)
*F16C 23/04* (2006.01)

(52) U.S. Cl.
CPC ............. *B65G 23/06* (2013.01); *B65G 15/64* (2013.01); *F16C 23/045* (2013.01); *F16C 2326/58* (2013.01)

(58) Field of Classification Search
CPC ........ B65G 23/06; B65G 23/12; B65G 23/04; B65G 23/16; B65G 23/14
USPC ............................ 198/832, 834, 835, 781.09
See application file for complete search history.

(56) References Cited

U.S. PATENT DOCUMENTS

| | | | | |
|---|---|---|---|---|
| 3,938,721 A * | 2/1976 | Staneck | ................... | B41J 11/30 226/75 |
| 4,627,702 A * | 12/1986 | Anderson | ............ | G03G 15/755 198/835 |
| 5,199,552 A * | 4/1993 | Dauchez | ................ | B65G 23/06 198/834 |
| 5,470,293 A * | 11/1995 | Schonenberger | ...... | A63B 22/02 198/834 |
| 6,564,932 B2 * | 5/2003 | Itoh | ........................ | B65G 15/64 198/834 |
| 7,681,717 B2 * | 3/2010 | DeGroot | ................ | B65G 15/30 198/832 |
| 8,188,384 B2 * | 5/2012 | Verhaar | ................ | G01G 11/003 177/119 |
| 2002/0134651 A1* | 9/2002 | Itoh | ........................ | B65G 15/64 198/835 |

* cited by examiner

*Primary Examiner* — James R Bidwell
(74) *Attorney, Agent, or Firm* — Weitzman Law Offices, LLC

(57) ABSTRACT

A conveyor belt transport system involves a driving shaft, a driven shaft, a pair of rollers, and a conveyor belt. The rollers each include a shaft hole running from one end to the other end and each end of the shaft hole is fitted with radial spherical plain bearings. The respective radial spherical bearings ride on the drive shaft and the driven shaft. The conveyor belt wraps around the rollers that, respectively, surround the driving shaft and the driven shaft. The two ends of both the driving shaft and the driven shaft each include belt wheels and the outer end of the belt wheels each include a guard board. The conveyor belt comprises a timing belt on an inner surface of each outside edge of the conveyor belt, and the inner surface of the timing belt includes concave teeth that matingly engage the belt wheels.

4 Claims, 4 Drawing Sheets

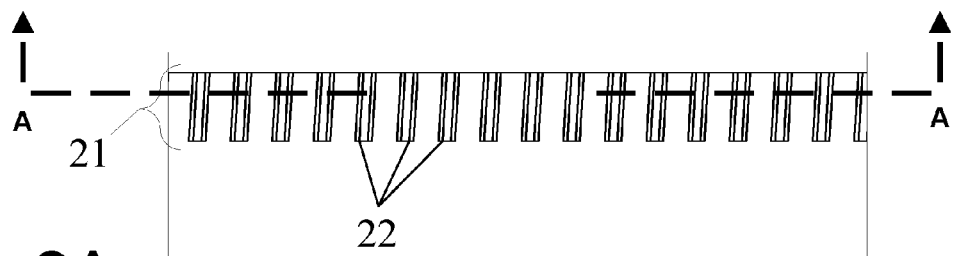
FIG. 2A
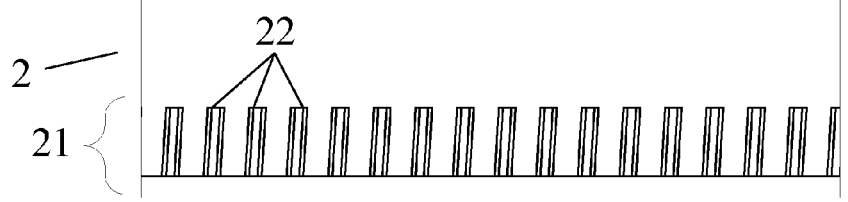
FIG. 2B
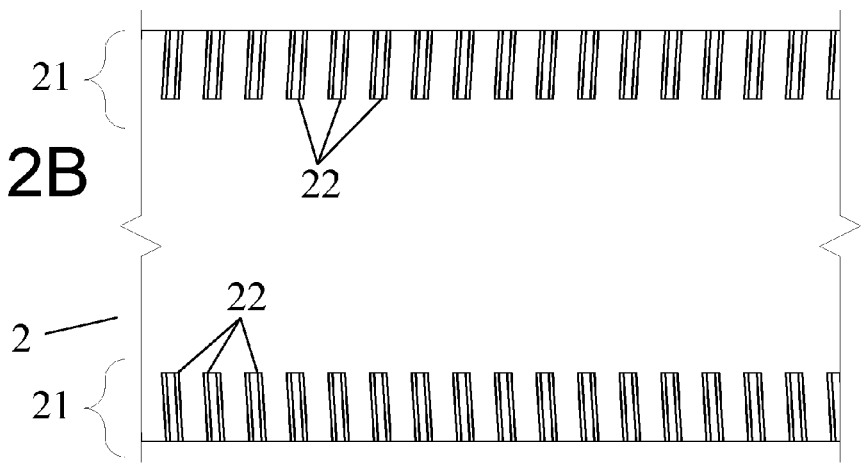
FIG. 2C
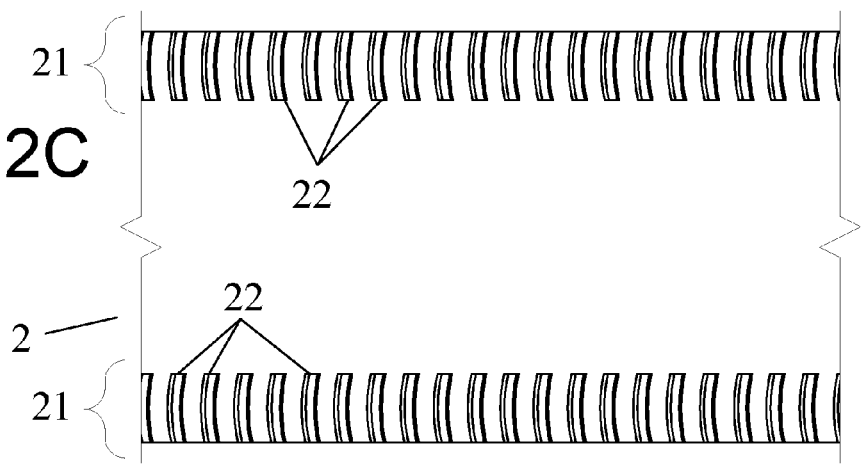

CONVEYOR BELT BASED TRANSPORT SYSTEM

FIELD OF THE INVENTION

This disclosure relates generally to transportation systems and, more particularly, to transport systems that use a conveyor belt.

BACKGROUND

Conveyor belts are used to transport various materials or products in industries. In general, such transport systems are mainly made up of a driving roller, a driven roller and a conveyor belt that wraps around the rollers. The driving roller relies on friction force to drive the conveyor belt. However, such a mode of driving through friction force has the following drawbacks: first, it is easy for the conveyor belt to slip, making it difficult to effectively transport materials; second, the driving roller and the driven roller tend to swing back and forth during high speed operation causing the conveyor belt to shift from side to side.

SUMMARY

We have developed a conveyor belt transport system, which solves the tendencies of conveyor belts according to the prior art to slip and deviate during operation.

One aspect of this disclosure involves a conveyor belt transport system having a driving shaft, a driven shaft, a pair of rollers, and a conveyor belt. The rollers each include a shaft hole running from one end to the other end. Each end of the shaft hole is fitted with radial spherical plain bearings. The radial spherical bearings of one of the rollers of the pair rides on the drive shaft and the radial spherical bearings of an other of the rollers of the pair rides on the driven shaft. The conveyor belt wraps around the rollers that, respectively, surround the driving shaft and the driven shaft. The two ends of both the driving shaft and the driven shaft each include belt wheels and the outer end of the belt wheels each include a guard board. The conveyor belt further comprises a timing belt on an inner surface of each outside edge of the conveyor belt, and the inner surface of the timing belt includes concave teeth that matingly engage the belt wheels.

Another aspect of the disclosure involves the guard boards being round and the diameter of the guard boards being greater than the diameter of the belt wheels.

Further aspects of the disclosure involve the teeth on the inner surface of the timing belt being stepped teeth.

Finally, some aspects of the disclosure involve the teeth on the inner surface of the timing belt being arc-shaped teeth.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIGS. 2A-2E illustrate, in simplified form, different example conveyor belts for use with implementations of our transport system;

DETAILED DESCRIPTION

Figure 1:
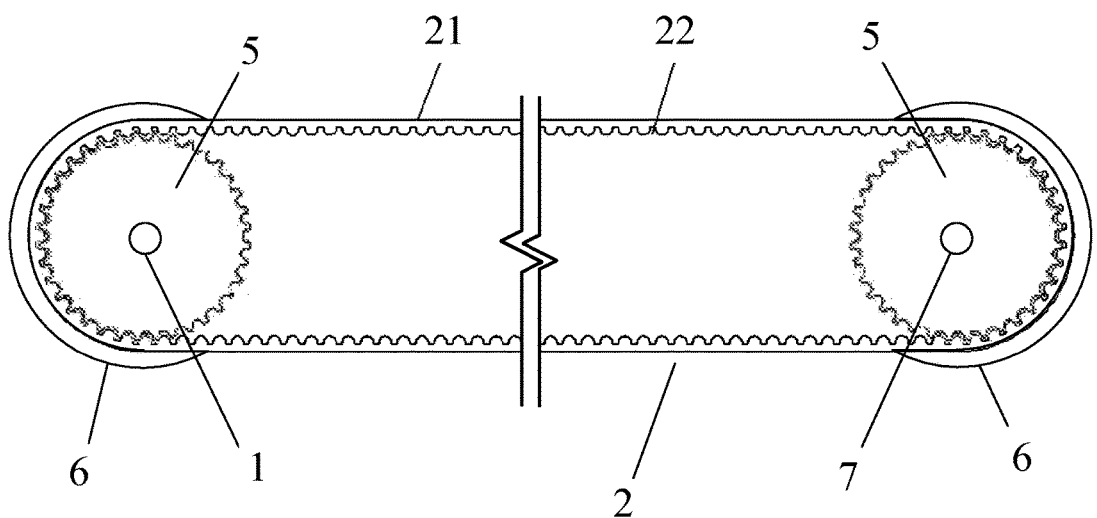
FIG. 1 illustrates, in simplified form, a cross sectional view of a conveyor belt and belt wheels assembly of our transport system viewed as taken at A-A of the conveyor belt and belt wheel of, respectively, FIG. 2A and FIG. 3.
Figure 3:
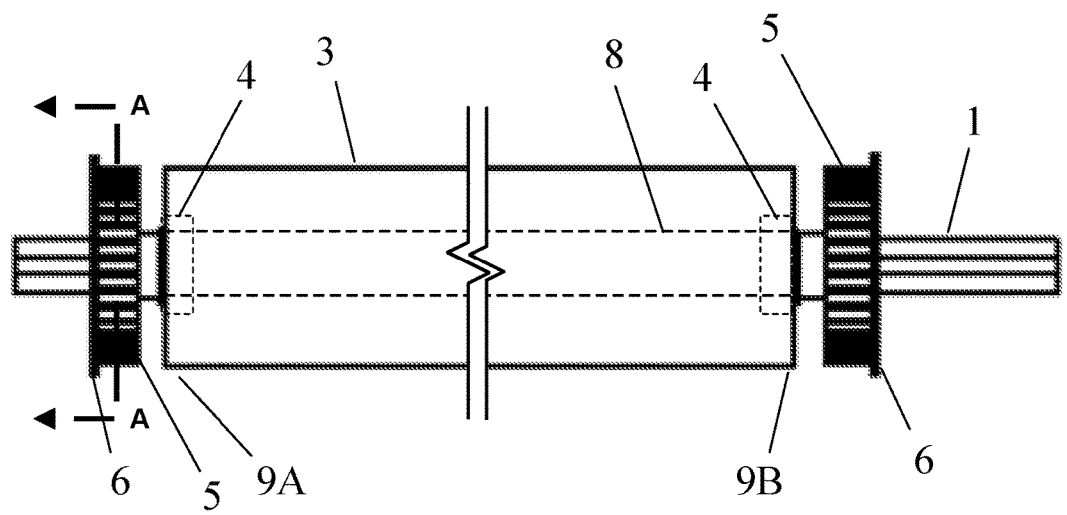
FIG. 3 illustrates, in simplified form, a schematic view of an example driving shaft as described herein.

Specific examples of our conveyor belt based transport system will now be described with reference to the accompanying drawings. It should be apparent that the described examples are only representative of a few, not all, of the embodiments that can be created based upon this disclosure. All other embodiments that can be created by those skilled in the art based on the examples herein are intended to be encompassed by the present disclosure.

As used herein, the various forms of the term "non-deviating" are intended to mean and encompass, in combination, not slipping and not shifting from side to side.

Referring to FIG. 1 through FIG. 4, the conveyor belt transport system comprises a driving shaft 1, a driven shaft 7, rollers 3 and a conveyor belt 2. The center of the roller 3 is formed with a shaft hole 8 running from one end 9A to the other end 9B. The two ends of the shaft hole 8 are fitted with radial spherical plain bearings 4. A roller 3 respectively surrounds each of the driving shaft 1 and the driven shaft 7, and can rotate via the radial spherical plain bearings 4.

The conveyor belt 2 wraps around the rollers 3 surrounding each of the driving shaft 1 and driven shaft 7.

Figure 2D:
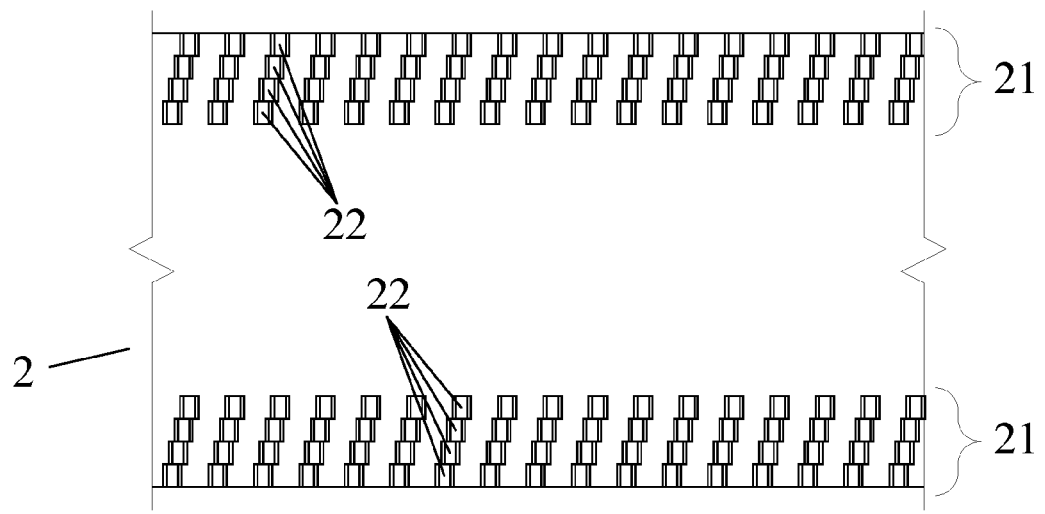
Figure 2E:
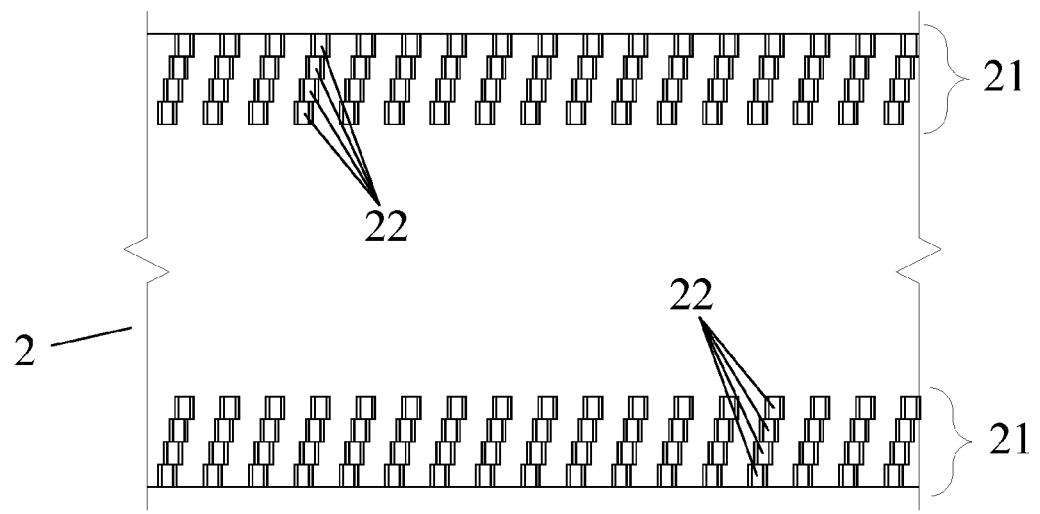
Figure 4:
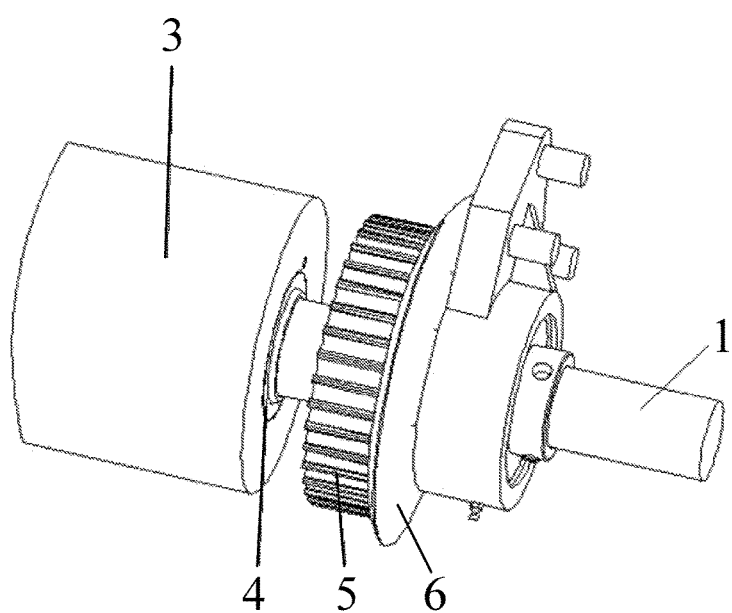
FIG. 4 illustrates, in simplified form, a partial perspective view of one end of an example driving shaft as described herein.

The two ends of the driving shaft 1 and the driven shaft 7 are both provided with belt wheels 5. The outer end of each of the belt wheels 5 is provided with a guard board 6. The guard board 6 may be round or of other shapes, as long as the diameter (or size if other shapes) of the guard board 6 is greater than the diameter of the belt wheels 5. The outside edge portions of the interior surface of the conveyor belt 2 each include a timing belt 21. The timing belt 21 portions of the conveyor belt 2 include concave teeth 22 arranged to matingly engage teeth of the belt wheels 5. The concave teeth 22 of the conveyor belt 2 are typically stepped teeth (FIGS. 2A-2B (continuous), or FIGS. 2D-2E (discrete)) or arc-shaped teeth (FIG. 2C). However, depending on need, the individual teeth 22 may, of course, be other tooth shapes.

The addition of the belt wheels 5 and of the timing belts 21 to the conveyor belt outside interior edges prevents the conveyor belt 2 from slipping during use through the cooperation between the belt wheels 5 and the timing belts 21. In addition, the guard boards 6 at the outer ends of the belt wheels 5 prevent the conveyor belt 2 from swinging back and forth on the rollers 3 during high speed operation in the manner of conventional conveyor belts that can cause such conveyor belts to shift. At the same time, during high speed operation, conventional rollers could be caused to swing back and forth. However, since the two ends of the roller 3 are connected to the driving shaft 1 and the driven shaft via the radial spherical plain bearings 4, the radial spherical plain bearings 4 allows the roller 3 to stay in a stable position, thereby achieving the goal of automatic alignment of the roller 3 with no need for manual adjustment.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A conveyor belt transport system, comprising:
a driving shaft;
a driven shaft;
a pair of rollers; and
a conveyor belt;
the rollers each include a shaft hole running from one end to the other end;
each end of the shaft hole is fitted with radial spherical plain bearings;
the radial spherical bearings of one of the rollers of the pair rides on the drive shaft and the radial spherical bearings of an other of the rollers of the pair rides on the driven shaft;
the conveyor belt wraps around the rollers that, respectively, surround the driving shaft and the driven shaft;
the two ends of both the driving shaft and the driven shaft each include belt wheels having tooth-receiving recesses;
the outer end of the belt wheels each include a guard board abutting the tooth-receiving recesses;
the conveyor belt further comprises a timing belt on an inner surface of each outside edge of the conveyor belt, and
the inner surface of the timing belt, at each of the outside edges, includes concave teeth that matingly engage the belt wheels adjacent to the guard board.

2. The conveyor belt transport system of claim 1, wherein the guard board is round and the diameter of the guard board is greater than the diameter of the belt wheels.

3. The conveyor belt transport system of claim 2, wherein the teeth on the inner surface of the timing belt are stepped teeth.

4. The conveyor belt transport system of claim 2, wherein the teeth on the inner surface of the timing belt are arc-shaped teeth.

* * * * *